(12) United States Patent
Torii (10) Patent No.: US 9,197,707 B2
(45) Date of Patent: Nov. 24, 2015

(54) NETWORK INTERFACE DETERMINING APPARATUS AND METHOD

(71) Applicant: Osamu Torii, Kanagawa (JP)

(72) Inventor: Osamu Torii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 194 days.

(21) Appl. No.: 13/705,257

(22) Filed: Dec. 5, 2012

(65) Prior Publication Data

US 2013/0179571 A1    Jul. 11, 2013

(30) Foreign Application Priority Data

Jan. 6, 2012    (JP) ................... 2012-000931

(51) Int. Cl.
*G06F 15/173*    (2006.01)
*H04L 29/08*    (2006.01)
*H04L 29/14*    (2006.01)

(52) U.S. Cl.
CPC .............. *H04L 67/14* (2013.01); *H04L 67/141* (2013.01); *H04L 69/40* (2013.01)

(58) Field of Classification Search
CPC ........ H04L 67/141; H04L 67/14; H04L 69/40
USPC ................................................. 709/224, 225
See application file for complete search history.

(56) References Cited

U.S. PATENT DOCUMENTS 7,690,570 B2 *  4/2010  Fruhauf ..................... 235/451
8,195,247 B2 *  6/2012  Lee ....................... H04L 12/10
                                                 370/311
2002/0038400 A1 *  3/2002  Fukushima ................ 710/300
2002/0198977 A1 * 12/2002  Cho ........................... 709/223
2003/0065753 A1 *  4/2003  Taninaka et al. .......... 709/220
2004/0114601 A1 *  6/2004  Watanabe et al. ........ 370/395.2

(Continued)

FOREIGN PATENT DOCUMENTS

CN    101207494 A    6/2008
CN    101420346 A    4/2009

(Continued)

OTHER PUBLICATIONS

Office Action for Corresponding Chinese Patent Application No. 201210591098.3 dated May 4, 2015.

(Continued)

*Primary Examiner* — Kostas Katsikis
(74) *Attorney, Agent, or Firm* — Harness, Dickey & Pierce, P.L.C.

(57) ABSTRACT

The present invention provides a novel communications apparatus that includes a plurality of wired LAN functions and wireless LAN functions and facilitates determining which network interface is to be enabled more flexibly. The communications apparatus of this invention switches a plurality of wired LAN functions and wireless LAN functions and includes a network interface control unit that enables and disables wired LAN and wireless LAN, a wired LAN communication availability status acquisition unit that detects that there is a change in the status of communication availability of wired LAN and acquires the status of communication availability of wired LAN, and a network interface determining unit that enables only one network interface from communication availability status of wired LAN acquired by the wired LAN communication availability status acquisition unit and a plurality of operating states of the apparatus.

11 Claims, 10 Drawing Sheets

(56) References Cited

U.S. PATENT DOCUMENTS

| | | | |
|---|---|---|---|
| 2004/0148445 A1* | 7/2004 | Lee et al. | 710/72 |
| 2005/0193100 A1* | 9/2005 | Woolf et al. | 709/220 |
| 2005/0276269 A1* | 12/2005 | Kim | 370/395.2 |
| 2005/0280511 A1* | 12/2005 | Yokoyama et al. | 340/10.5 |
| 2006/0056446 A1* | 3/2006 | Lee et al. | 370/465 |
| 2006/0182128 A1* | 8/2006 | Nakata et al. | 370/401 |
| 2009/0058707 A1* | 3/2009 | Craze et al. | 341/176 |
| 2009/0086681 A1* | 4/2009 | Chaturvedi et al. | 370/332 |
| 2009/0142034 A1* | 6/2009 | Sotomaru | 386/83 |
| 2009/0144456 A1* | 6/2009 | Gelf et al. | 710/8 |
| 2009/0245258 A1 | 10/2009 | Tanaka et al. | |
| 2010/0100621 A1* | 4/2010 | O'Connell et al. | 709/224 |
| 2010/0302958 A1* | 12/2010 | Wietfeldt et al. | 370/252 |
| 2010/0325266 A1* | 12/2010 | Nishimura et al. | 709/224 |
| 2010/0325284 A1* | 12/2010 | Heim et al. | 709/227 |
| 2011/0179462 A1* | 7/2011 | Kubo et al. | 725/110 |
| 2012/0042066 A1* | 2/2012 | Chatterjee et al. | 709/224 |
| 2012/0220376 A1* | 8/2012 | Takayama et al. | 463/42 |
| 2012/0287774 A1* | 11/2012 | Hinkle et al. | 370/216 |
| 2013/0036450 A1* | 2/2013 | Kim et al. | 726/3 |
| 2014/0177435 A1* | 6/2014 | Miyamoto et al. | 370/221 |

FOREIGN PATENT DOCUMENTS

| | | |
|---|---|---|
| CN | 101873723 A | 10/2010 |
| CN | 102025612 A | 4/2011 |
| JP | 10-164114 | 6/1998 |
| JP | 2005-020112 A | 1/2005 |
| JP | 2008-022263 | 1/2008 |
| JP | 2009-111688 A | 5/2009 |
| JP | 2009-246525 A | 10/2009 |
| JP | 4495254 B2 | 6/2010 |

OTHER PUBLICATIONS

Office Action for Corresponding Japanese Patent Application No. 2012-000931 dated Aug. 25, 2015.

* cited by examiner

FIG. 3

| NETWORK SETTING | MEANING OF SETTING |
|---|---|
| PRIORITIZE WIRED LAN | ENABLE WIRED LAN IF WIRED LAN IS AVAILABLE ENABLE WIRELESS LAN IF WIRED LAN IS NOT AVAILABLE |
| WIRED LAN | ENABLE WIRED LAN |
| WIRELESS LAN | ENABLE WIRELESS LAN |
| DISABLE | NETWORK INTERFACE IS NOT IN USE |

FIG. 4

| EXAMPLES OF POWER STATUS | AVAILABILITY OF WIRED LAN | AVAILABILITY OF WIRELESS LAN |
|---|---|---|
| POWER ON | A (Available) | A |
| UNDER WARM-UP | A | A |
| STAND-BY (LAN POWER ON) | A | A |
| STAND-BY (ONLY WIRELESS LAN POWER OFF) | A | N.A. (Not Available) |
| POWER OFF | N.A. (Not Available) | N.A. (Not Available) |

FIG. 5A

| FIG. 5 | |
|---|---|
| FIG. 5A | FIG. 5B |
| FIG. 5C | FIG. 5D |

| | CABLE STATUS | CONNECTED (COMMUNICATION AVAILABLE) | | |
|---|---|---|---|---|
| | POWER STATUS | NORMAL (POWER ON) | | |
| EVENT | NETWORK I/F SETTINGS | PRIORITIZE WIRED LAN | WIRED LAN | WIRELESS LAN | DISABLED |
| | CONNECTION STATUS | WIRED LAN CONNECTED | WIRED LAN CONNECTED | WIRELESS LAN CONNECTED | NO CONNECTION |
| WIRED LAN AVAILABLE | | | | | |
| WIRED LAN NOT AVAILABLE | | CHANGE TO "WIRELESS LAN CONNECTED" | CHANGE TO "NO CONNECTION" | IGNORE | |
| CHANGE SETTING | | "WIRED LAN CONNECTED" | "WIRED LAN CONNECTED" | "WIRED LAN CONNECTED" | NONE |
| CHANGE POWER STATUS | | | | | |

FIG. 5B

| | | EXCEPT POWER ON | | |
|---|---|---|---|---|
| | | PRIORITIZE WIRED LAN | WIRED LAN | WIRELESS LAN | DISABLED |
| | WIRED LAN CONNECTED | | WIRED LAN CONNECTED | • POWER STATUS IN WHICH WIRELESS LAN CANNOT BE USED → "NO CONNECTION" • BESIDES → WIRELESS LAN CONNECTED | NO CONNECTION |
| | | • POWER STATUS IN WHICH WIRELESS LAN CANNOT BE USED → "NO CONNECTION" • BESIDES → CHANGE TO "WIRELESS LAN CONNECTED" | CHANGE TO "NO CONNECTION" | | |
| | | | | IGNORE | IGNORE |
| | | | | • POWER STATUS IN WHICH WIRELESS LAN CANNOT BE USED → "NO CONNECTION" • BESIDES → CHANGE TO "WIRELESS LAN CONNECTED" | |
| | IGNORE | | IGNORE | | IGNORE |

FIG. 5C

| EVENT | CABLE STATUS | | | DISCONNECTED (COMMUNICATION NOT AVAILABLE) | | |
|---|---|---|---|---|---|---|
| | POWER STATUS | | | NORMAL (POWER ON) | | |
| | NETWORK I/F SETTINGS | | | PRIORITIZE WIRED LAN | WIRED LAN | DISABLED |
| | | | CONNECTION STATUS | WIRELESS LAN CONNECTED | NO CONNECTION | NO CONNECTION |
| WIRED LAN COMMUNICATION AVAILABLE | | | | CHANGE TO "WIRED LAN CONNECTED" | CHANGE TO "WIRED LAN CONNECTED" | IGNORE |
| WIRED LAN COMMUNICATION NOT AVAILABLE | | | | ///// | ///// | ///// |
| CHANGE SETTING | | | | ///// | CHANGE TO "WIRELESS LAN CONNECTED" | CHANGE TO "WIRELESS LAN CONNECTED" |
| CHANGE POWER STATUS | | | | ///// | ///// | ///// |

| ///// | EVENT CANNOT OCCUR |
|---|---|
| IGNORE | WHILE SETTINGS AND POWER STATUS ARE CHANGED, NETWORK I/F IS NOT SWITCHED |
| CHANGE TO "WIRED LAN CONNECTED" | ENABLE WIRED LAN |
| CHANGE TO "WIRELESS LAN CONNECTED" | ENABLE WIRELESS LAN |
| CHANGE TO "NO CONNECTION" | CHANGE NETWORK I/F TO "NONE" |

FIG. 5D

| EXCEPT POWER ON | | | |
|---|---|---|---|
| PRIORITIZE WIRED LAN | WIRED LAN | WIRELESS LAN | DISABLED |
| • POWER STATUS IN WHICH WIRELESS LAN CANNOT BE USED<br>→ "NO CONNECTION"<br>• BESIDES<br>→ WIRELESS LAN CONNECTED | NO CONNECTION | • POWER STATUS IN WHICH WIRELESS LAN CANNOT BE USED<br>→ "NO CONNECTION"<br>• BESIDES<br>→ WIRELESS LAN CONNECTED | NO CONNECTION |
| CHANGE TO "WIRED LAN CONNECTED" | CHANGE TO "WIRED LAN CONNECTED" | IGNORE | IGNORE |
| • POWER STATUS IN WHICH WIRELESS LAN CANNOT BE USED<br>→ CHANGE TO "WIRELESS LAN CONNECTED"<br>• BESIDES<br>IGNORE | IGNORE | • POWER STATUS IN WHICH WIRELESS LAN CANNOT BE USED<br>→ CHANGE TO "WIRELESS LAN CONNECTED"<br>• BESIDES<br>IGNORE | IGNORE |

NETWORK INTERFACE DETERMINING APPARATUS AND METHOD

CROSS-REFERENCE TO RELATED APPLICATIONS

This patent application is based on and claims priority pursuant to 35 U.S.C. §119 to Japanese Patent Application No. 2012-000931, filed on Jan. 6, 2012, in the Japan Patent Office, the entire disclosure of which is hereby incorporated by reference herein.

BACKGROUND OF THE INVENTION

1. Field of the Invention

The present invention relates to a communications apparatus and method, and more particularly to an apparatus that facilitates switching from wired LAN to wireless LAN and vice versa.

2. Description of the Background Art

Conventionally, in communications apparatuses that include a wired communication function (wired LAN) and a wireless communication function (wireless LAN), configurations such as using both wired LAN and wireless LAN together, and enabling only one of wired LAN or wireless LAN exclusively to cut energy consumption have been conceived and are well-known.

A technology of a network terminal that includes wired LAN and wireless LAN and switches between wired LAN and wireless LAN automatically by detecting the connection status of a wired LAN cable solely by monitoring the insertion and the removal of the wired LAN cable to save time and effort has been proposed (e.g., JP-H10-164114-A.)

In the technology described in JP-H10-164114-A, switching between wired LAN and wireless LAN is determined by detecting the connection status of the wired LAN cable. However, it cannot be determined which one, wired LAN or wireless LAN, is to be enabled based on multiple different operating states of the apparatus.

SUMMARY OF THE INVENTION

The present invention provides a novel communications apparatus that includes a plurality of wired LAN functions and wireless LAN functions and facilitates determining which network interface is to be enabled more flexibly.

More specifically, the present invention provides a communications apparatus that switches between wired LAN functions and wireless LAN functions and includes a network interface control unit that enables and disables wired LAN and wireless LAN, a wired LAN communication availability status acquisition unit that detects that there is a change in the status of communication availability of wired LAN and acquires the status of communication availability of wired LAN, and a network interface determining unit that enables only one network interface from communication availability status of wired LAN acquired by the wired LAN communication availability status acquisition unit and a plurality of operating states of the apparatus.

In the present invention, in the communications apparatus that includes a plurality of wired LAN functions and wireless LAN functions, it can be flexibly determined which network interface is to be enabled by considering not only connection status of wired LAN cable but also a plurality of operating states of the apparatus in case only one network interface is enabled exclusively.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION OF THE INVENTION

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings.

Figure 1:
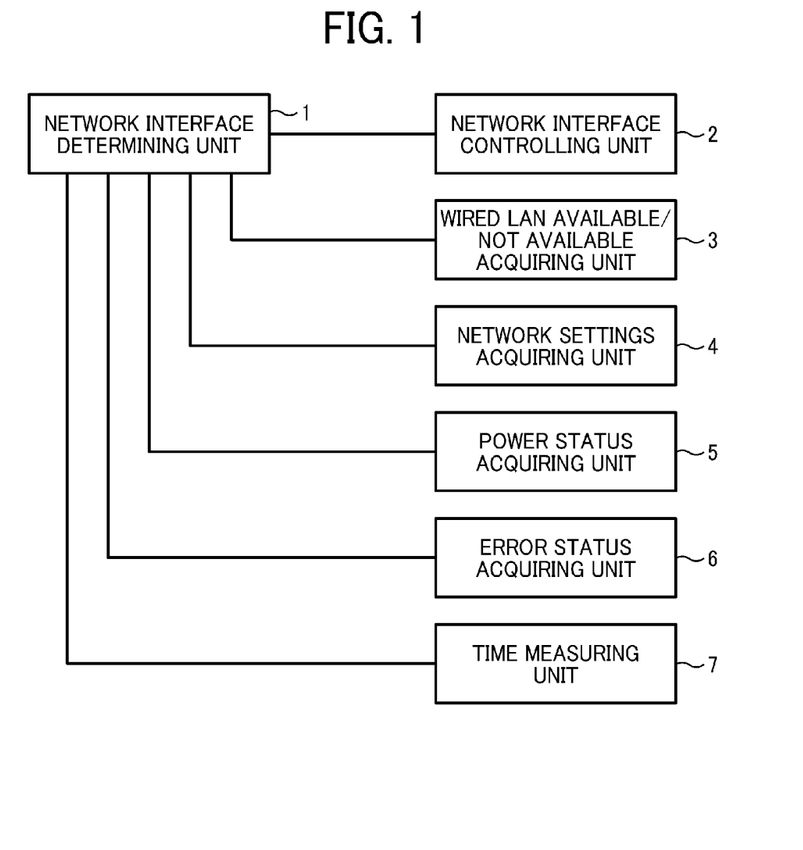
FIG. 1 is a diagram illustrating a software configuration according to an embodiment of the present invention.

FIG. 1 is a diagram illustrating a software configuration in this embodiment. A network interface control unit 2, a wired LAN communication availability acquisition unit 3, a network setting acquisition unit 4, a power status acquisition unit 5, an error status acquisition unit 6, and a time measuring unit 7 are connected to a network interface determining unit 1.

The network interface determining unit 1 determines which network interface gets enabled by considering wired LAN communication availability status, network setting, power status of the apparatus, and error status of the apparatus.

The network interface control unit 2 allocates IP addresses for wired LAN and wireless LAN so that they can execute IP communication (enables network interface), and switches wired LAN and wireless LAN to the status not available for IP communication (disables network interface).

The wired LAN communication availability acquisition unit 3 detects any change in the status of wired LAN communication availability. Also, the wired LAN communication availability acquisition unit 3 acquires the status of wired LAN communication availability. The network setting acquisition unit 4 detects change in network settings. Also, the network setting acquisition unit 4 acquires network settings set in the apparatus. It should be noted that network settings are user settings necessary for network communication, such as DHCP availability, IP address setting, subnet mask, and SSID.

The power status acquisition unit 5 detects change in the power status of the apparatus. Also, the power status acquisition unit 5 acquires the power status of the apparatus. The error status acquisition unit 6 detects any error that occurs in the apparatus. The time measuring unit 7 determines that a predefined period of time has elapsed.

Figure 2:
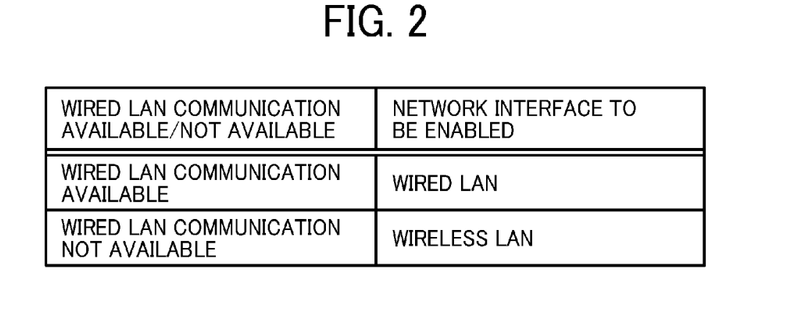
FIG. 2 is a chart correlating wired LAN communication availability and enabled network interface according to an embodiment of the present invention.

FIG. 2 is a chart correlating wired LAN communication availability and enabled network interface. More specifically, FIG. 2 shows an example of the logic used in determining which network interface gets enabled depending on wired LAN communication availability in the communications apparatus that includes a plurality of network interfaces. In FIG. 2, an example in which wired LAN gets enabled if wired LAN communication is available and wireless LAN gets enabled if wired LAN communication is not available is shown. The wired LAN communication availability acquisition unit 3 detects change in the status of wired LAN communication availability and acquires the status of wired LAN communication availability with reference to an example such as that shown in FIG. 2, and the network interface determining unit 1 switches network interface.

Figure 3:
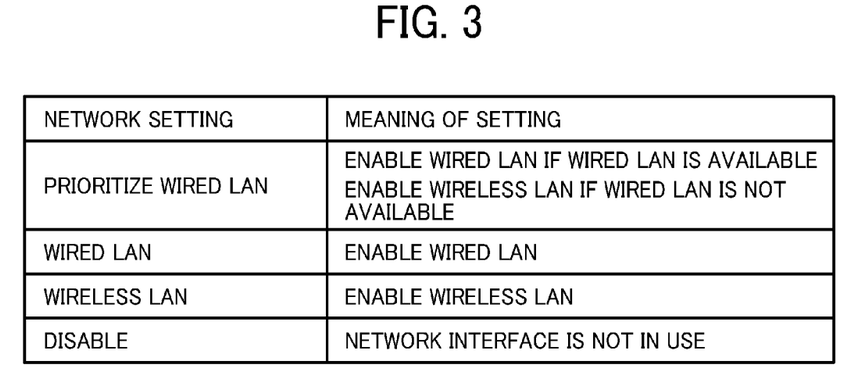
FIG. 3 is a chart correlating examples of network settings and enabled network interface.

FIG. 3 is a chart correlating examples of network settings and enabled network interface. FIG. 3 shows an example of settings for deciding priority to determine which network interface gets enabled in the communications apparatus that includes a plurality of network interfaces. How network interface is switched is determined by settings set by a user. The network setting acquisition unit 4 detects change in the network settings and acquires the network settings, and the network interface determining unit determines whether or not it switches network interface.

Switching network interface is determined automatically only if wired LAN and wireless LAN are used exclusively, so in case a user wants to keep on using either network, the unintended switching process of network interface is not executed even if the user connects or removes a wired LAN cable for greater convenience.

Figure 4:
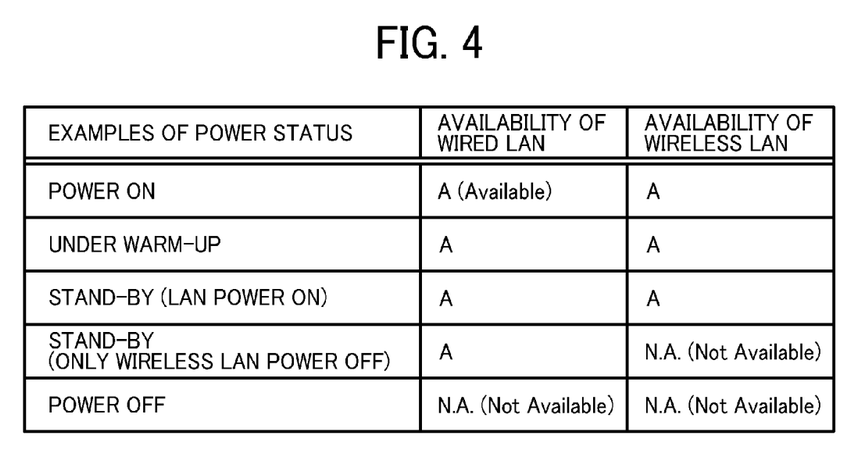
FIG. 4 is a diagram illustrating examples of possible power statuses and network communication availability in each power status.
Figure 5A:
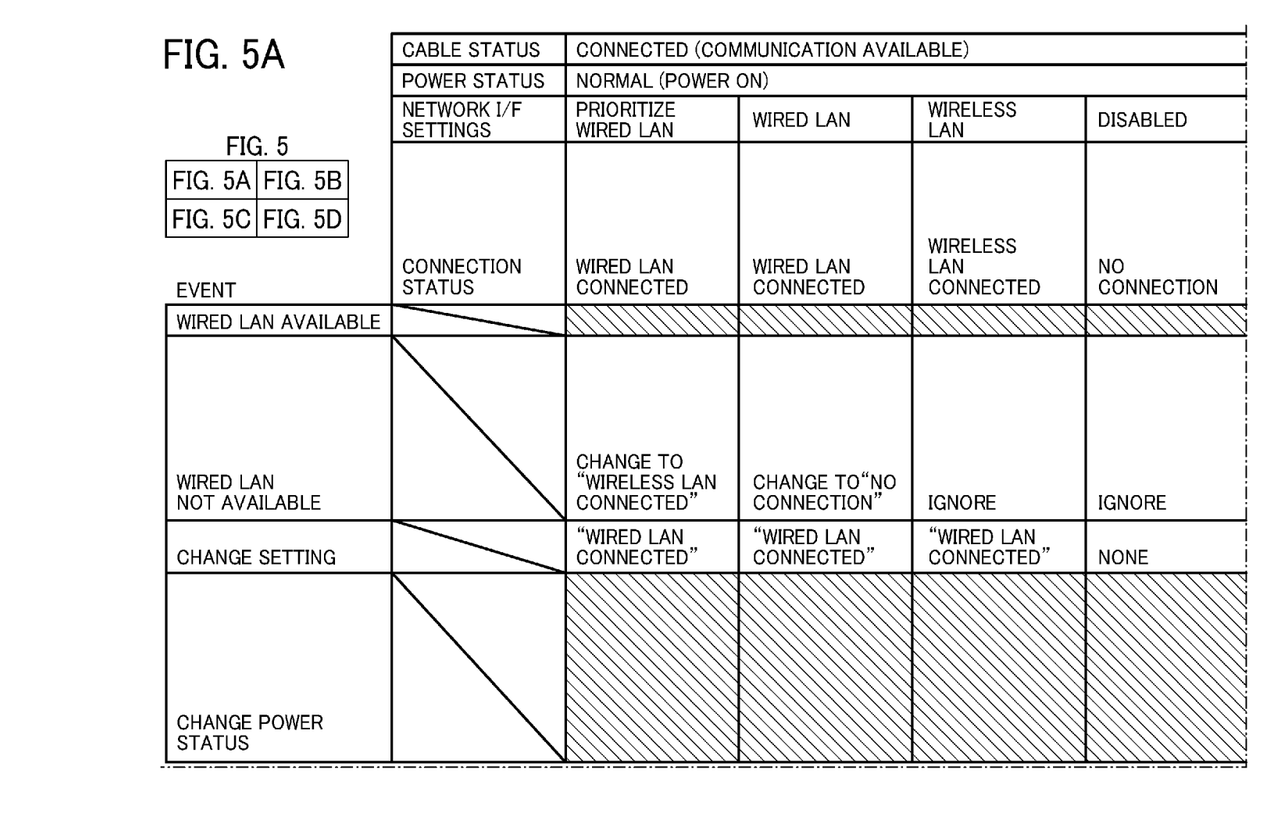
FIGS. 5A, 5B, 5C, and 5D are charts that illustrate which network interface gets enabled when change in the status of wired LAN communication availability, change in network settings, and change of the power status occurs as the switching event of network interface occurs.
Figure 5B:
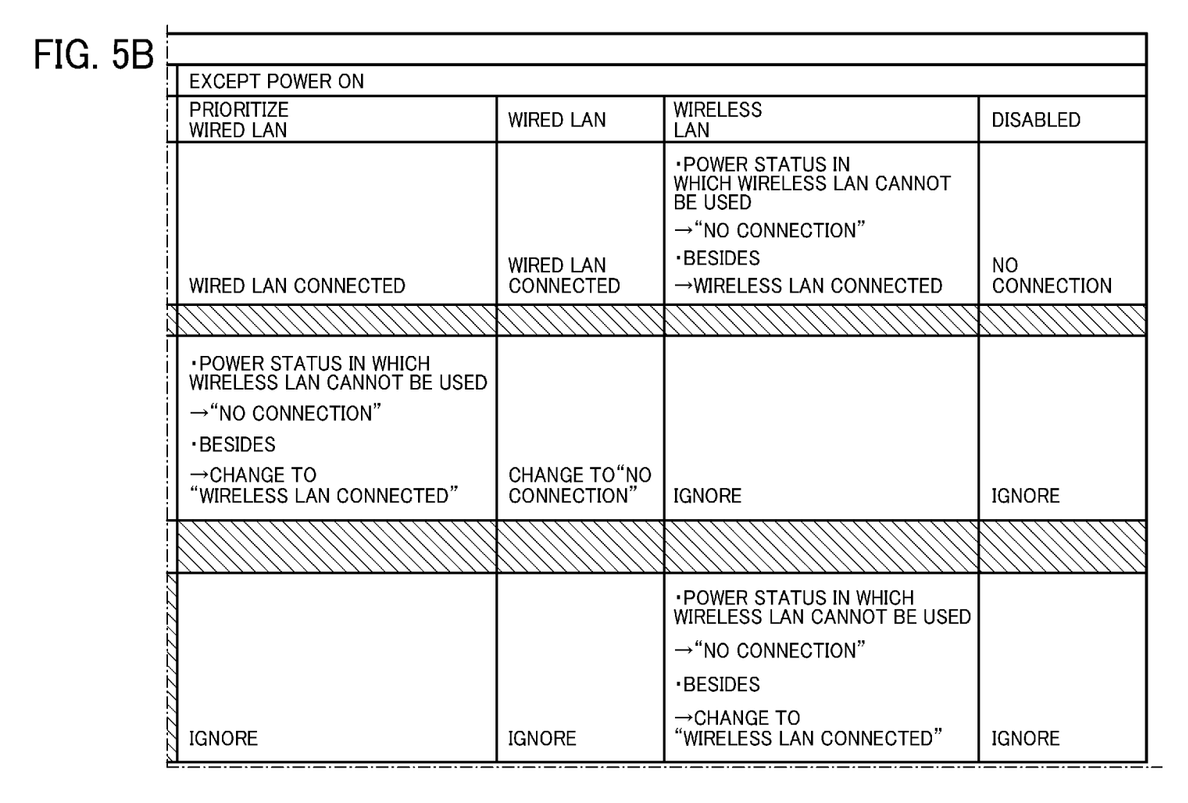
Figure 5C:
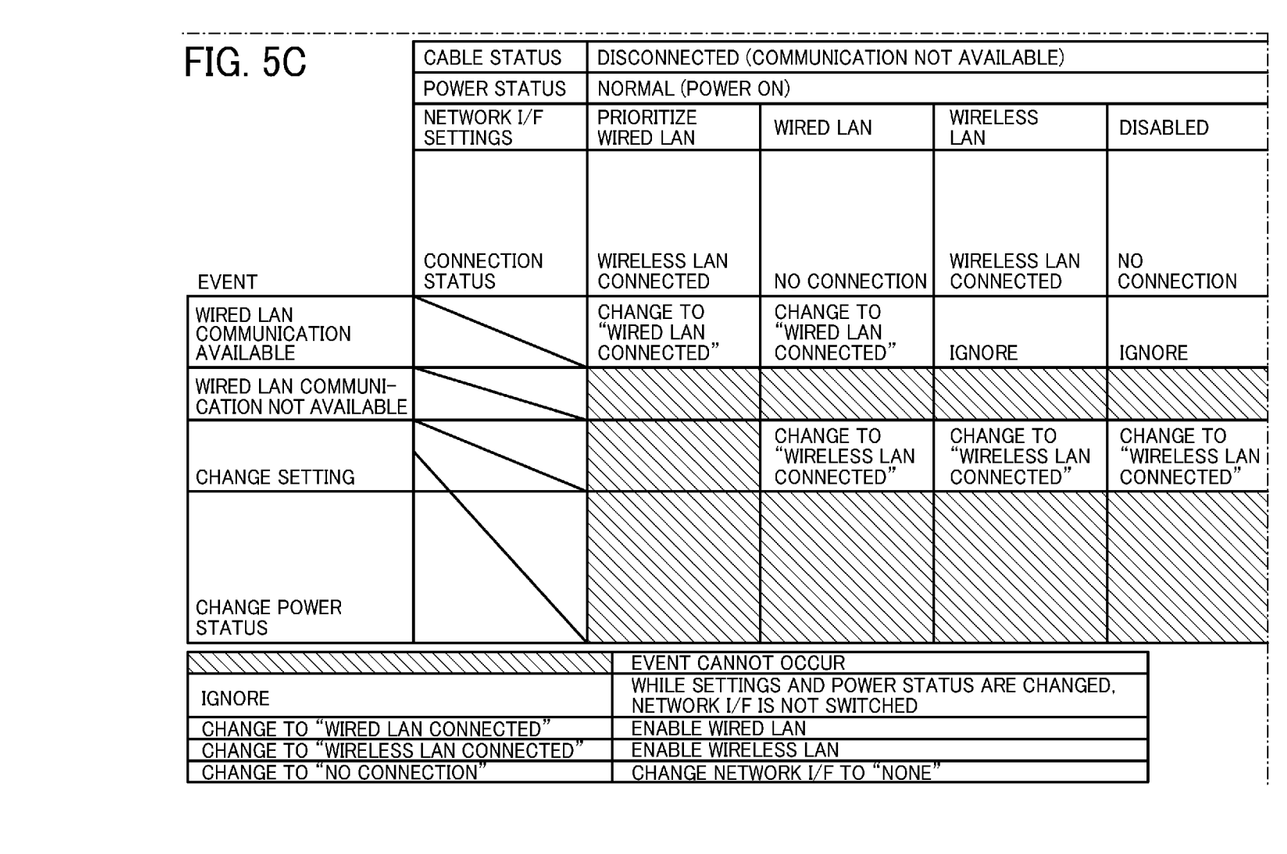
Figure 5D:
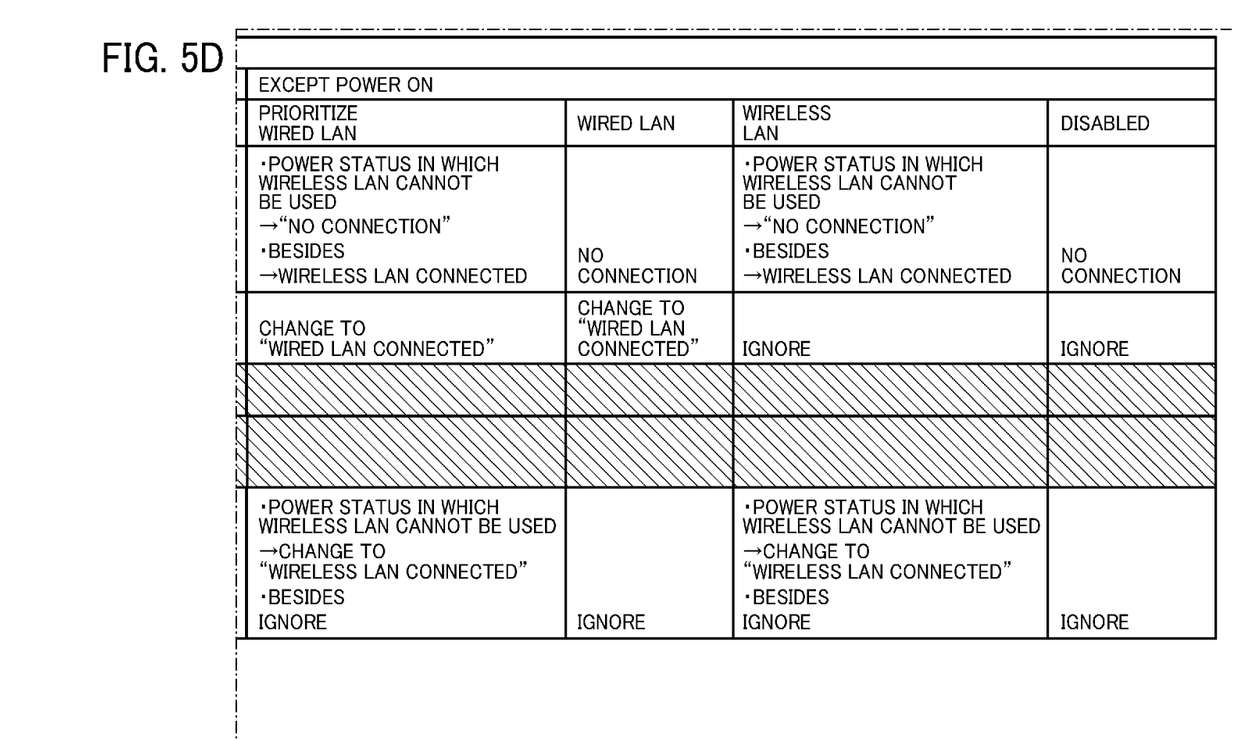

FIG. 4 is a diagram illustrating examples of possible power statuses and network communication availability in each power status. The power status acquisition unit 5 detects change in the power status of the apparatus and acquires the power status with considering power status such as shown in FIG. 4, and the network interface determining unit 1 determines whether or not network interface is switched.

Switching process of network interface is not executed needlessly since a situation in which the network interface cannot be switched due to the power status of the apparatus after trying to switch network interface when the status of wired LAN communication availability is changed does not occur, and that improves efficiency.

Also, switching to wired LAN or wireless LAN is not executed needlessly in a situation in which the network interface cannot be switched due to the power status or the apparatus after trying to switch from wireless LAN to wired LAN or from wired LAN to wireless LAN does not occur, and that improves efficiency.

FIGS. 5A, 5B, 5C, and 5D are charts that illustrate which network interface gets enabled when change in the status of wired LAN communication availability, change in network settings, and change of the power status occurs as the switching event of network interface.

Other network switching events in addition to events described above are conceivable. Determining whether or not network interface is switched automatically with reference to a plurality of conditions and switching network interface automatically if necessary is the technical feature of this embodiment.

Figure 6:
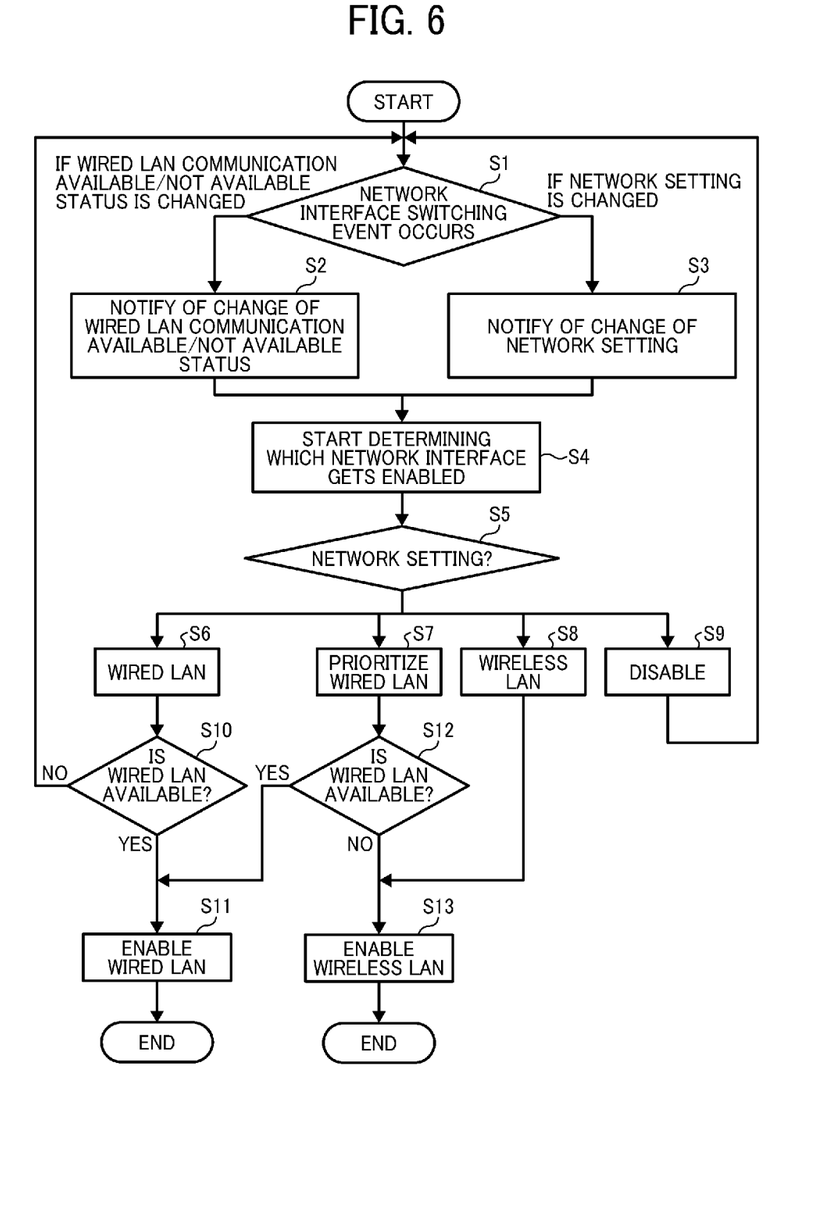
FIG. 6 is a flowchart illustrating changing which network interface gets enabled depending on the setting of network interface.

FIG. 6 is a flowchart illustrating changing which network interface gets enabled depending on the setting of network interface.

If the status of wired LAN communication availability is changed after a network switching event occurs (step S1), the wired LAN communication availability acquisition unit 3 detects the status of wired LAN communication availability (S2). If the network setting is changed, the network setting acquisition unit 4 detects change in the network settings (S3) and determining which network interface gets enabled is started (S4).

The network setting acquisition unit 4 sets network setting (S5). If the network setting set in the apparatus is wired LAN (S6), the network interface determining unit 1 determines whether or not wired LAN is available by checking the wired LAN communication availability acquisition unit 3 (S10). If wired LAN is available (YES in S10), the network interface control unit 2 enables wired LAN (S11). If wired LAN is not available (NO in S10), the process returns to the beginning.

If the network setting is prioritizing wired LAN (S7), the network interface determining unit 1 determines whether or not wired LAN is available by checking the wired LAN communication availability acquisition unit 3 (S12). If wired LAN is available (YES in S12), the network interface control unit 2 enables wired LAN (S11). If wired LAN is not available (NO in S10), the network interface control unit 2 enables wireless LAN (S13).

If the network setting is set to wireless LAN (S8), the network interface control unit 2 enables wireless LAN (S13). If the network setting is set to disable (S9), the process returns to the beginning.

Figure 7:
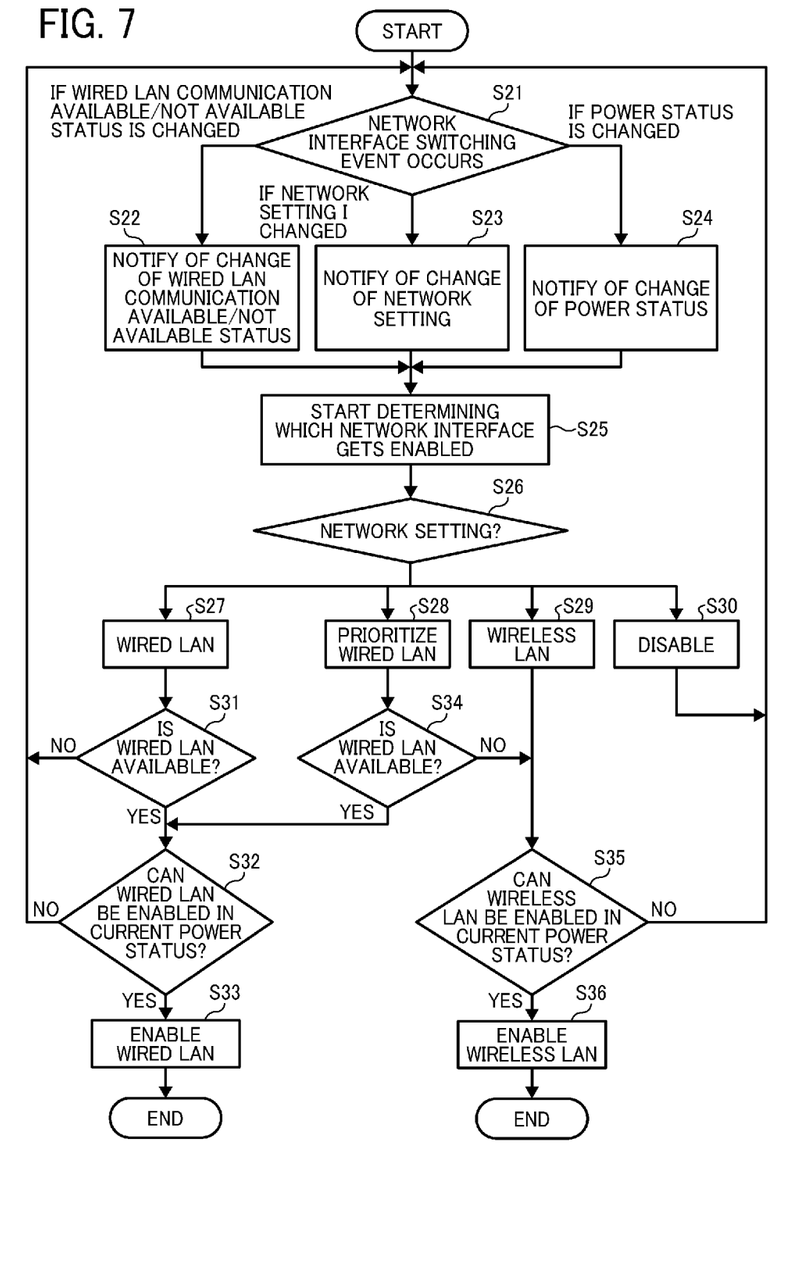
FIG. 7 is a flowchart illustrating checking the power status before determining which network interface ultimately gets enabled.

FIG. 7 is a flowchart illustrating checking the power status before determining which network interface ultimately gets enabled.

If the status of wired LAN communication availability is changed after network switching event occurs (S21), the wired LAN communication availability acquisition unit 3 detects the status of wired LAN communication availability (S22). If the network setting is changed, the network setting acquisition unit 4 detects change in the network settings (S23). The power status acquisition unit 5 detects change in the power status if the power status is changed (S24), and determining which network interface gets enabled is started (S25).

The network setting acquisition unit 4 sets network setting (S26). If the network setting set in the apparatus is wired LAN (S27), the network interface determining unit 1 determines whether or not wired LAN is available by checking the wired LAN communication availability acquisition unit 3 (S31). If wired LAN is not available (NO in S31), the process returns to the beginning.

If wired LAN is available (YES in S31), the network interface determining unit 1 determines whether or not the power status is one in which wired LAN can be enabled by checking the power status acquisition unit 5 (S32). If the power status is one in which wired LAN can be enabled (YES in S32), the network interface control unit 2 enables wired LAN (S33). Otherwise (NO in S32), the process returns to the beginning.

If the network setting is set to prioritizing wired LAN (S28), the network interface determining unit 1 determines whether or not wired LAN is available by checking the wired LAN communication availability acquisition unit 3 (S34). If wired LAN is available (YES in S34), the network interface determining unit 1 determines whether or not the power status is one in which wired LAN can be enabled by checking the power status acquisition unit 5 (S32). The following steps are the same as described above.

If wired LAN is not available (NO in S34), the network interface determining unit 1 determines whether or not the power status is one in which wireless LAN can be enabled by checking the power status acquisition unit 5 (S35). If the power status is one in which wireless LAN can be enabled (YES in S35), the network interface control unit 2 enables wireless LAN (S36). Otherwise (NO in S35), the process returns to the beginning.

If the network setting is set to wireless LAN (S29), the network interface determining unit 1 determines whether or not wireless LAN is available by checking the power status acquisition unit 5 (S35). The following steps are the same as described above. If the network setting is set to disable (S30), the process returns to the beginning.

Figure 8:
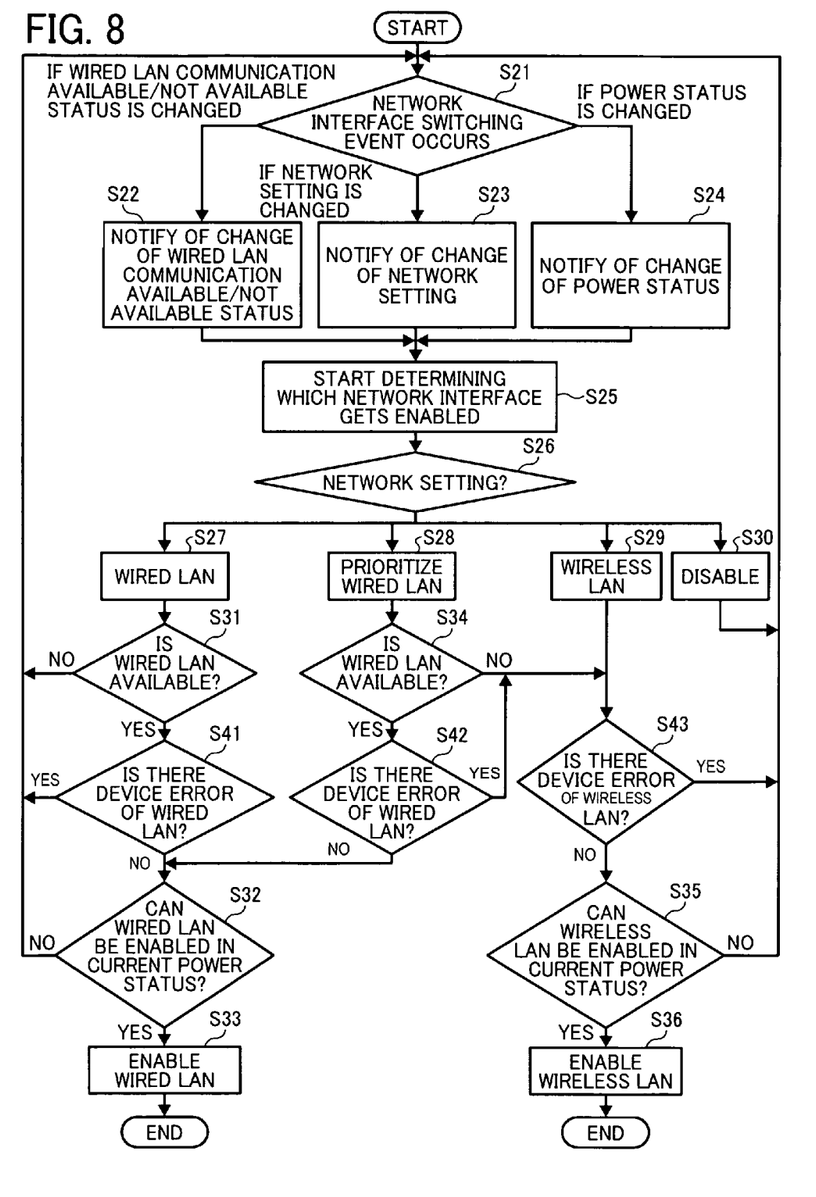
FIG. 8 is a flowchart illustrating checking whether or not device error occurs in the network interface which is to be enabled.

FIG. 8 is a flowchart illustrating checking whether or not device error occurs in the network interface which is to be enabled. The same steps as in FIG. 7 are given the same reference numerals and a description thereof is omitted.

The network setting acquisition unit 4 sets network setting (S26). If the network setting set in the apparatus is wired LAN (S27), the network interface determining unit 1 determines whether or not wired LAN is available by checking the wired LAN communication availability acquisition unit 3 (S31). If wired LAN is not available (NO in S31), the process returns to the beginning. If wired LAN is available (YES in S31), the network interface determining unit 1 determines whether or not device error occurs in wired LAN by checking the error status acquisition unit 6 (S41). If device error occurs in wired LAN (NO in S41), the process returns to the beginning.

If device error does not occur in wired LAN (YES in S41), the network interface determining unit 1 determines whether or not the power status is one in which wired LAN can be enabled by checking the power status acquisition unit 5 (S32). If the power status is one in which wired LAN can be enabled (YES in S32), the network interface control unit 2 enables wired LAN (S33). Otherwise (NO in S32), the process returns to the beginning.

If the network setting is set to prioritizing wired LAN (S28), the network interface determining unit 1 determines whether or not wired LAN is available by checking the wired LAN communication availability acquisition unit 3 (S34). If wired LAN is available (YES in S34), the network interface determining unit 1 determines whether or not device error occurs in wired LAN by checking the error status acquisition unit 6 (S42). If device error does not occur in wired LAN (YES in S42), the network interface determining unit 1 determines whether or not the power status is one in which wired LAN can be enabled by checking the power status acquisition unit 5 (S32). The following steps are the same as described above.

If wired LAN is not available (NO in S34) or device error occurs in wired LAN (NO in S42), the network interface determining unit 1 determines whether or not device error occurs in wireless LAN by checking the error status acquisition unit 6 (S43). If device error occurs in wireless LAN (NO in S43), the process returns to the beginning.

If device error does not occur in wireless LAN (YES in S43), the network interface determining unit 1 determines whether or not the power status is one in which wireless LAN can be enabled with reference to the power status acquisition unit 5 (S35). If the power status is one in which wireless LAN can be enabled (YES in S35), the network interface control unit 2 enables wireless LAN (S36). Otherwise (NO in S35), the process returns to the beginning.

If the network setting is set to wireless LAN (S29), the network interface determining unit 1 determines whether or not device error occurs in wired LAN by checking the error status acquisition unit 6 (S43). The following steps are the same as described above. If the network setting is set to disable (S30), the process returns to the beginning.

In the embodiment described above, switching process of network interface is not executed needlessly since situation in which network interface cannot be switched due to the error status of the apparatus after trying to switch network interface when the status of wired LAN communication availability is changed does not occur, and that improves efficiency.

Also, switching process to wired LAN or wireless LAN is not executed needlessly since situation in which network interface cannot be switched due to the error status or the apparatus after trying to switch from wireless LAN to wired LAN or from wired LAN to wireless LAN does not occur, and that improves efficiency.

Figure 9:
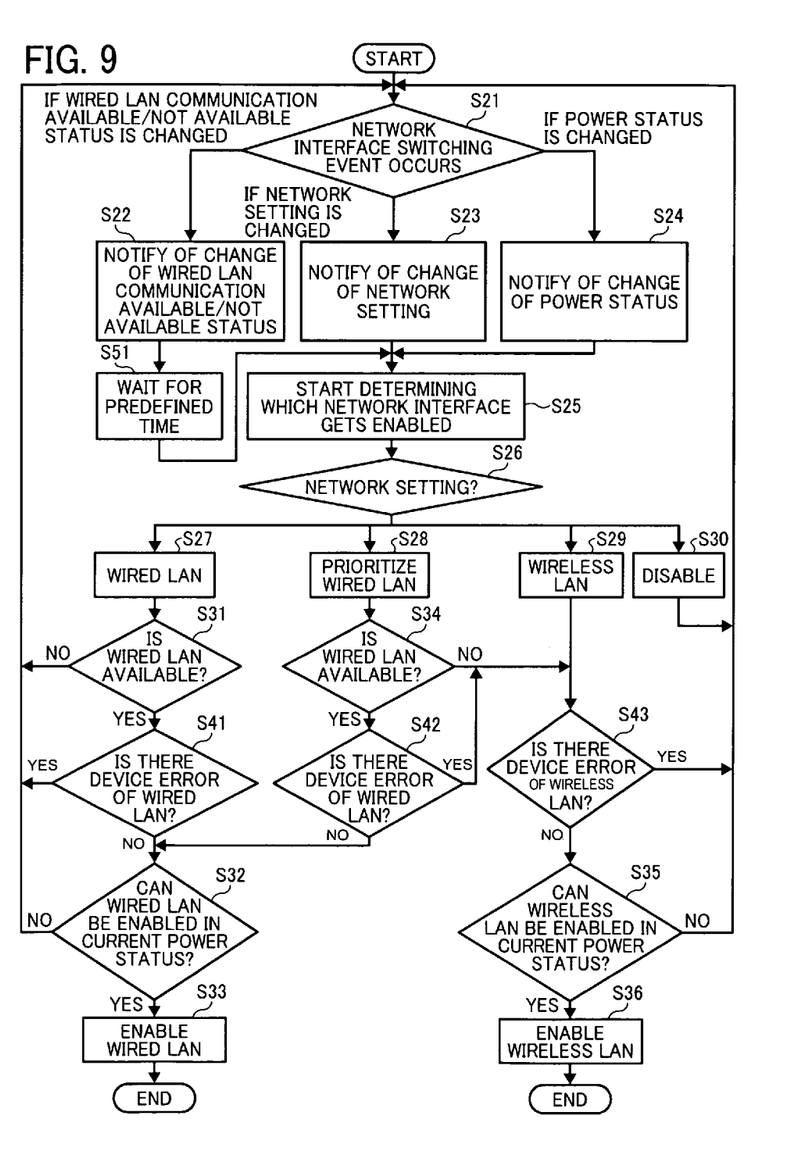
FIG. 9 is a flowchart illustrating determining whether or not network interface is switched after waiting for a predefined period of time in case of detecting change in the status of wired LAN communication availability.

FIG. 9 is a flowchart illustrating determining whether or not network interface is switched after waiting for a predefined period of time in case of detecting change in the status of wired LAN communication availability. The same steps as in FIG. 8 are given the same reference numerals and descriptions thereof are omitted.

If the status of wired LAN communication availability is changed after network switching event occurs (S21), the wired LAN communication availability acquisition unit 3 detects that the status of wired LAN communication availability is changed (S22) and the time measuring unit 7 measures the passage of a predefined period of time. After the time measuring unit 7 waits for a predefined period of time (S51), the network interface determining unit 1 starts determining which network interface gets enabled (S25). The following steps are the same as described above.

For example, if speed setting of wired LAN is changed, negotiation process on the data link layer level is executed temporarily and it is impossible to communicate by using wired LAN during that time. In this situation, the status of wired LAN availability makes the transition from available, not available, to available.

In the embodiment described above, switching process to wired LAN or wireless LAN is not executed needlessly since it is not necessary to switch network interface each time the status changes in case the status of wired LAN communication availability changes continuously during predefined period of time, and that improves efficiency of the communications apparatus.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the electrical engineering arts.

What is claimed is:

1. A communications apparatus, comprising:
a central processing unit (CPU); and
a memory, the memory being connected to the CPU and storing instructions that, when executed by the CPU, cause the CPU to implement,
a network interface control unit configured to enable and disable wired local area network (LAN) communications of the communications apparatus and wireless LAN communications of the communications apparatus;
a wired LAN communication availability status acquisition unit configured to detect that there is a change in status of communication availability of a wired LAN and acquire the status of communication availability;
a network interface determining unit configured to enable only one network interface determined based on the status of communication availability of the wired LAN acquired by the wired LAN communication availability status acquisition unit and a plurality of operating states of the apparatus; and
a power status acquisition unit configured to detect a change of power status of the communications apparatus and acquire the power status,
an error status acquisition unit configured to acquire an error status of the communications apparatus,
wherein the network interface determining unit is configured to,
generates a first determination result by determining, whether the power status is one in which the wired LAN communications can be enabled by checking the power status acquisition unit, and
based on the first determination result, determines whether to switch to the wireless LAN communications or the wired LAN communications, and
wherein,
the network interface determining unit is configured to determine to switch from the wireless LAN communications to the wired LAN communications only when the error status does not indicate a wired LAN communications device error, and
the network interface determining unit is configured to determine to switch from the wired LAN communications to the wireless LAN communications only when the error status does not indicate a wireless LAN communications device error.

2. The communications apparatus according to claim 1, wherein the instructions, when executed by the CPU, further cause the CPU to implement a network setting acquisition unit configured to detect a change of network settings and acquire network setting set in the communications apparatus, and
wherein the communications apparatus includes the network setting acquired by the network setting acquisition unit as condition to determine which network interface gets enabled.

3. The communications apparatus according to claim 1, wherein the communications apparatus is configured to determine whether the wired LAN communications are available,
wherein the plurality of operating states includes a network setting of the communication apparatus, the network setting having one of a plurality of setting types, the plurality of setting types including a first setting type,
wherein the communications apparatus is configured such that, if the setting type of the network setting is the first setting type, and the wireless LAN communications are enabled,
the communications apparatus does not enable the wired LAN communication in response to determining that the wired LAN communications are available.

4. The communications apparatus according to claim 1, wherein the network interface determining unit is configured such that the network interface determining unit switches from enabling the wireless LAN communications to enabling the wired LAN communications only if the status type of the power status of the communications apparatus acquired by the power status acquisition unit is the first status type or the second status type.

5. The communications apparatus according to claim 1, wherein the network interface determining unit is configured such that the network interface determining unit switches from enabling the wired LAN communications to enabling the wireless LAN communications only if the status type of the power status of the communications apparatus acquired by the power status acquisition unit is the first status type.

6. The communications apparatus according to claim 1, wherein the plurality of operating states of the communications apparatus used to determine which network interface gets enabled includes the error status of the communications apparatus acquired by the error status acquisition unit.

7. The communications apparatus according to claim 6, wherein the network interface determining unit is configured such that the network interface determining unit does not enable the wired LAN communications if an error in which the wired LAN communications are not available is detected in the error status of the communications apparatus acquired by the error status acquisition unit.

8. The communications apparatus according to claim 6, wherein the network interface determining unit is configured such that the network interface determining unit does not enable the wireless LAN communications if an error in which the wireless LAN communications are not available is detected in the error status of the communications apparatus acquired by the error status acquisition unit.

9. The communications apparatus according to claim 1, wherein the instructions, when executed by the CPU, further cause the CPU to implement a time measuring unit to measure passage of a predefined period of time,
wherein the communications apparatus is configured to determines whether or not network interface is switched only if the status of the wired LAN communications communication availability is kept unchanged after passage of the predefined period of time measured by the time measuring unit in case the wired LAN communication availability status acquisition unit detects a change in status of a wired LAN cable.

10. A method controlling communications of a communications apparatus, comprising the steps of:
enabling and disabling wired local area network (LAN) communications of the communications apparatus and wireless LAN communications of the communications apparatus;
detecting that there is change in a status of communication availability of the wired LAN communications and acquiring the status of communication availability; and
enabling only one of the wired LAN communications and the wireless LAN communications determined based on the status of communication availability of the wired LAN communications and a plurality of operating states of the communications apparatus;
acquiring an error status of the communications apparatus,
the detecting including detecting a change of a power status of the communications apparatus and acquiring the power status, the enabling including,
  generating a first determination result by determining whether the power status is one in which wired LAN can be enabled by checking the acquired power status, and
  based on the first determination result, determining whether to switch to the wireless LAN communications or wired LAN communications,
wherein,
  the enabling includes determining to switch from the wireless LAN communications to the wired LAN communications only when the error status does not indicate a wired LAN communications device error, and
  the enabling includes determining to switch from the wired LAN communications to the wireless LAN communications only when the error status does not indicate a wireless LAN communications device error.

11. A communications apparatus, comprising:
processor; and
a memory storing instructions,
the processor being configured to receive the instructions, the instructions being instructions that, when executed by the processor, cause the processor to perform operations including,
  enabling and disabling wired local area network (LAN) communications of the communications apparatus and wireless LAN communications of the communications apparatus,
  detecting a change in status of communication availability of a wired LAN,
  acquiring the status of communication availability,
  enabling only one network interface determined based on the acquired status of communication availability and a plurality of operating states of the communications apparatus; and
  detecting a change of power status of the communications apparatus,
  acquiring the power status,
  acquiring an error status of the communications apparatus,
wherein the enabling only one network interface includes,
  generating a first determination result by determining whether the power status is one in which the wired LAN communications can be enabled by checking the power status acquisition unit, and
  based on the first determination result, determining whether to switch to the wireless LAN communications or the wired LAN communications, and
wherein the determining whether to switch to the wireless LAN communications or the wired LAN communications includes,
  determining to switch from the wireless LAN communications to the wired LAN communications only when the error status does not indicate a wired LAN communications device error, and
  determining to switch from the wired LAN communications to the wireless LAN communications only when the error status does not indicate a wireless LAN communications device error.

* * * * *